(12) United States Patent
Ziegler et al.

(10) Patent No.: US 7,268,342 B2
(45) Date of Patent: Sep. 11, 2007

(54) DETERMINATION OF OPTICAL PROPERTIES OF A DEVICE UNDER TEST IN BOTH DIRECTIONS IN TRANSMISSION AND IN REFLECTION

(75) Inventors: Patrick Ziegler, Boeblinen (DE); Ralf Stolte, Hamburg (DE); Peter Thoma, Rottenburg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/500,596

(22) PCT Filed: Jan. 17, 2002

(86) PCT No.: PCT/EP02/00429

§ 371 (c)(1),
(2), (4) Date: Jan. 24, 2005

(87) PCT Pub. No.: WO03/060458

PCT Pub. Date: Jul. 24, 2003

(65) Prior Publication Data

US 2005/0121633 A1 Jun. 9, 2005

(51) Int. Cl.
*G02F 1/01* (2006.01)
*H01J 40/14* (2006.01)

(52) U.S. Cl. .................. 250/225; 250/227.14; 356/464; 356/73.1

(58) Field of Classification Search ........ 250/225–226, 250/227.14, 227.15, 227.16, 227.17, 227.18, 250/227.19; 356/73.1, 462, 464
See application file for complete search history.

(56) References Cited

U.S. PATENT DOCUMENTS

| | | | |
|---|---|---|---|
| 4,674,872 A | | 6/1987 | Wright ...................... 356/73.1 |
| 5,223,708 A | | 6/1993 | Van Deventer ........ 250/227.23 |
| 5,227,623 A | * | 7/1993 | Heffner ...................... 250/225 |
| 5,764,348 A | * | 6/1998 | Bloom ...................... 356/73.1 |
| 6,376,830 B1 | * | 4/2002 | Froggatt et al. ........ 250/227.14 |
| 6,426,792 B1 | * | 7/2002 | Yamashita .................. 356/73.1 |
| 6,788,396 B2 | * | 9/2004 | Stolte et al. ............... 356/73.1 |

FOREIGN PATENT DOCUMENTS

GB 1 376 245 12/1974

OTHER PUBLICATIONS

Patent Abstracts of Japan, Publication No. JP2262037.
Patent Abstracts of Japan, Publication No. JP61260141.
Patent Abstracts of Japan, Publication No. JP56122173.
Patent Abstracts of Japan, Publication No. JP63238452.
Patent Abstracts of Japan, Publication No. JP63292004.

* cited by examiner

*Primary Examiner*—Georgia Epps
*Assistant Examiner*—Patrick J. Lee

(57) ABSTRACT

A method and a measurement setup for determination of optical properties of a device under test in both directions in transmission and in reflection, includes a coding device distinguishably coding at least two parts of a provided measurement signal, feeding elements feeding the at least two parts into the DUT from both directions, receiving elements receiving the signals from both directions transmitted and reflected by the DUT, identifying at least the coded parts in the signals transmitted and reflected by the DUT, and analyzing at least the identified parts to determine at least one optical property of the DUT from both directions in transmission and in reflection.

15 Claims, 2 Drawing Sheets

DETERMINATION OF OPTICAL PROPERTIES OF A DEVICE UNDER TEST IN BOTH DIRECTIONS IN TRANSMISSION AND IN REFLECTION

This application is the National Stage of International Application No. PCT/EP02/00429, International Filing Date, 17 Jan. 2002, which designated the United States of America, and which international application was published under PCT Article 21(2) as WO Publication No. WO 03/060458 A1.

BACKGROUND OF THE INVENTION

The present invention relates to determination of optical properties, e.g. polarization dependent loss (PDL), polarization mode dispersion (PMD), differential group delay (DGD), insertion loss, return loss and/or chromatic dispersion (CD), of a device under test (DUT) in both directions in transmission and in reflection of an optical beam.

Measurement setups for the above-mentioned purpose shall be as easy as possible to handle and shall reveal all optical properties of the DUT as fast as possible and with as little handling as possible. This means that the DUT should be fully characterized to all parameters required when it is once connected to the measurement setup. For a full characterization it is required to measure all parameters both in transmission and in reflection as fast as possible.

From the disclosure of work of Sandel et al (David Sandel, Reinhold Noé, "Optical Network Analyzer applied for Fiber Bragg Grating Characterization", ECOC 97, 22-25 Sep. 1997, Conference Publication No. 448, © IEE, 1997, pp. 186-189; David Sandel et al, "Optical Network Analysis and Longitudinal Structure Characterization of Fiber Bragg Grating", Journal of Lightwave Technology, Vol. 16, No. 12, December 1998, pp. 2435-2442) it is known a method for polarization-resolved optical fiber Bragg grating characterization. However, in these disclosures only the reflection of the DUT is measured.

From a work of Froggatt at al (Froggatt et al, "Full Complex Transmission and Reflection Characterization of a Bragg Grating in a Single Laser Sweep", ) it is known a measurement setup to measure the group delay of a DUT in transmission and in reflection in both directions.

However, with the disclosed measurement setup it is not possible to measure PMD or PDL. Moreover, the measurement setup disclosed in this article causes problems because to enable the detectors used to detect the signals of reflection and transmission of both directions simultaneously, i.e. the reflected signal of one direction superimposed with the transmitted signal of the other direction and the transmitted signal of one direction superimposed with the reflected signal of the other direction, differences between the measurement and the reference path lengths are necessary to distinguish between these signals without really knowing all impacts of these differences.

Also the different path lengths for the various signals put additional requirements onto the receiver characteristics and the DUT characteristics which may be problematic for an accurate measurement.

SUMMARY OF THE INVENTION

Therefore, it is an object of the invention to provide improved determination of optical properties of a DUT in both directions in transmission and in reflection of an optical beam.

The object is solved by the independent claims.

An advantage of the present invention is that the DUT can be characterized with as little handling as possible. This means that the DUT can be fully characterized to all parameters required when it is once connected to the measurement setup. i.e. without handling of the DUT all transmission and reflection parameters can be measured in both directions.

In an embodiment of the invention this can be realized by using a switch to direct the incoming light to one of the ports of the DUT. This allows full characterization of the DUT by two wavelength sweeps of the tunable laser source to measure all parameters required for both directions without handling the DUT.

In another embodiment of the invention the switch is replaced by a beam splitter to provide the DUT with the laser beam from both directions simultaneously. Here the two fractions of the light propagating through the DUT in opposite directions are coded by two modulation frequencies. Then, the signals are detected by using a phase sensitive detection scheme, i.e. by a frequency selective detection.

Other preferred embodiments are shown by the dependent claims.

It is clear that the invention can be partly embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF THE INVENTION

Figure 1:
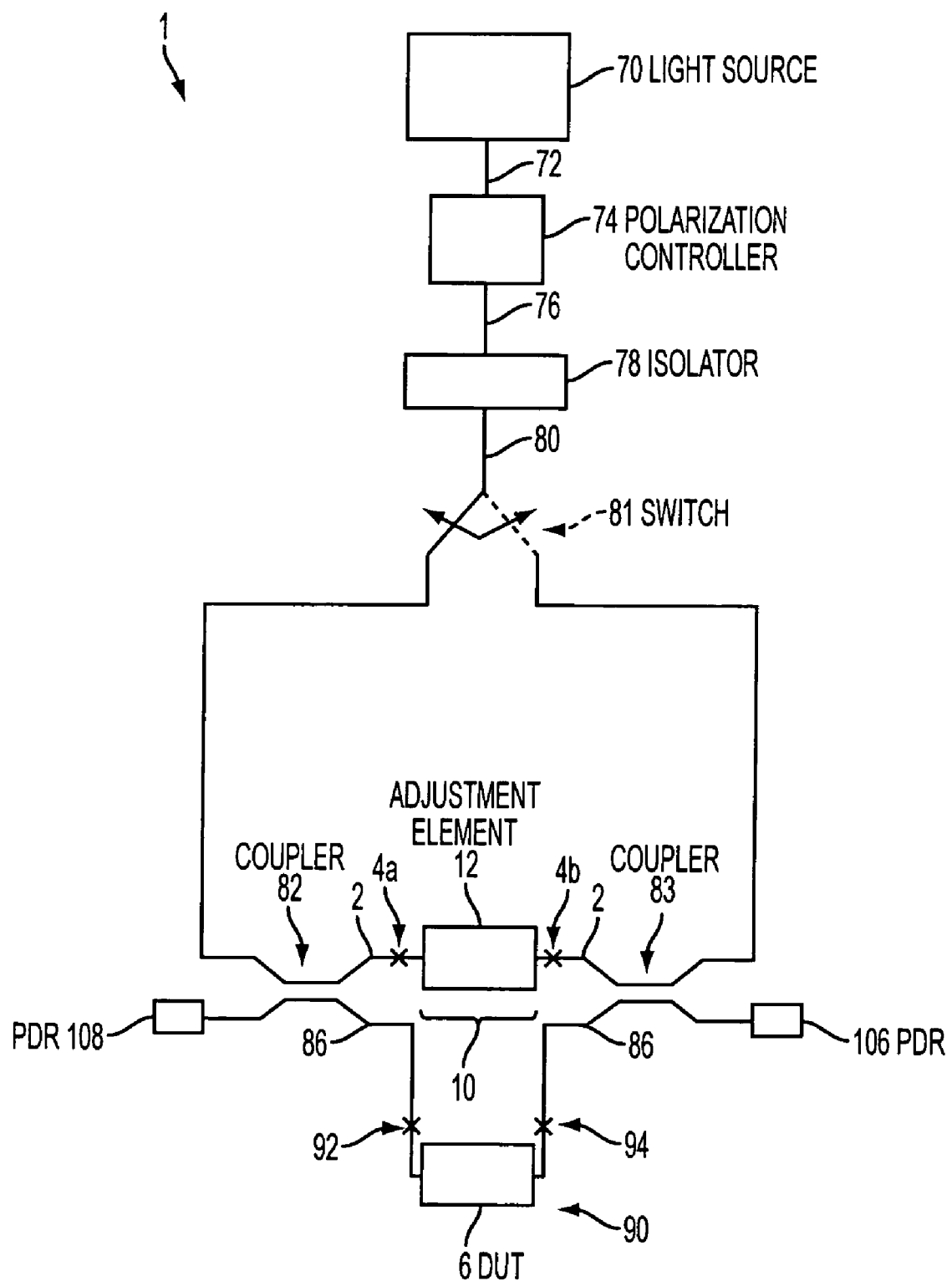
FIG. 1 shows a first measurement setup according to the present invention.

Referring now in greater detail to the drawings, FIG. 1 shows a first embodiment 1 of a measurement setup according to the present invention for determination of optical properties of a DUT 6 in transmission and in reflection in both directions.

Measurement setup 1 contains a tunable light source 70 which provides a coherent laser beam 72 to a polarization controller 74 (which can be a Hewlett-Packard HP 8169A). The polarization controller 74 provides a polarization controlled coherent light beam 76 to an isolator 78. Optically connected with the isolator 78 and receiving a coherent light beam 80 from the isolator 78 is a switch 81. The switch 81 is not located in the interferometric part of setup 1. Optically connected with the switch 81 is a first beam splitter 82 which is a 3 dB coupler. Also optically connected with the switch 81 is a second beam splitter 83 which is 3 dB coupler, also. Connected to both couplers 82 and 83 is a reference arm 2 and a measurement arm 86.

In the measurement arm there is provided a seat 90 to receive the DUT 6. The seat 90 has two connectors 92 and 94 to enable the DUT 6 to be connected to the measurement arm 86.

In the reference arm 2 there is provided a seat 10 to receive an element 12 being 50% reflective and 50% transparent. Other ratios are possible. The seat 10 has two connectors 4a and 4b to enable the element 12 to be connected to the reference arm 2. The element 12 can further contain an adjustment element to balance the optical path lengths in setup 1, e.g. a variable delay line to allow for different lengths of the path length through the DUT 6. Alternatively and preferred, this problem can be addressed by a sufficiently narrow spacing of the measurement points in the wavelength/frequency domain. For further details of the function of the element 12 it is referred to the European patent application EP-A-0 111 817 of the applicant. Therefore, the description of element and measurement setup given in the aforementioned application is incorporated herein by reference.

Such a measurement setup 1 can be calibrated and/or verified by a calibration and/or verification element disclosed in European patent application EP-A-0 111 833 of the applicant. For calibration and/or verification the calibration and/or verification element is inserted in seat 10. Therefore, the description of the calibration and/or verification of the measurement setup with the calibration and/or verification element given in the aforementioned application is incorporated herein by reference.

Connected to the coupler 83 is a polarization diversity receiver (PDR) 106 to detect a superimposed signal being the superposition of the transmitted signal by the DUT 6 and a reference signal coupled in by the coupler 83 from the reference arm 2 when the switch 81 is in its position according to the solid line in FIG. 1. In this case the reference signal is coupled into the reference arm 2 by the coupler 82. If the switch 81 is in its position according to the dotted line then the PDR 106 detects a superimposed signal being the superposition of the reflected signal by the DUT 6 and a reflected reference signal coupled in by the coupler 83 from the reference arm 2. In this case the reference signal is coupled into the reference arm 2 by the coupler 83.

Connected to the coupler 82 is also a PDR 108. PDR 108 detects the superimposed signal of the reflected signal from the DUT 6 coupled in by the coupler 82 from the reference arm and the reflected reference signal coupled in from the reference arm 2 coming from the element 12 when the switch 81 is in its position according to the solid line in FIG. 1. In this case the reference signal is coupled into the reference arm 2 by the coupler 82. If the switch 81 is in its position according to the dotted line then the PDR 108 detects a superimposed signal being the superposition of the transmitted signal by the DUT 6 and a transmitted reference signal transmitted by element 12. In this case the reference signal is coupled into the reference arm 2 by the coupler 83.

For further details it is referred to the European Patent Application 00125089.3 of the applicant the disclosure of which is incorporated herein by reference.

Figure 2:
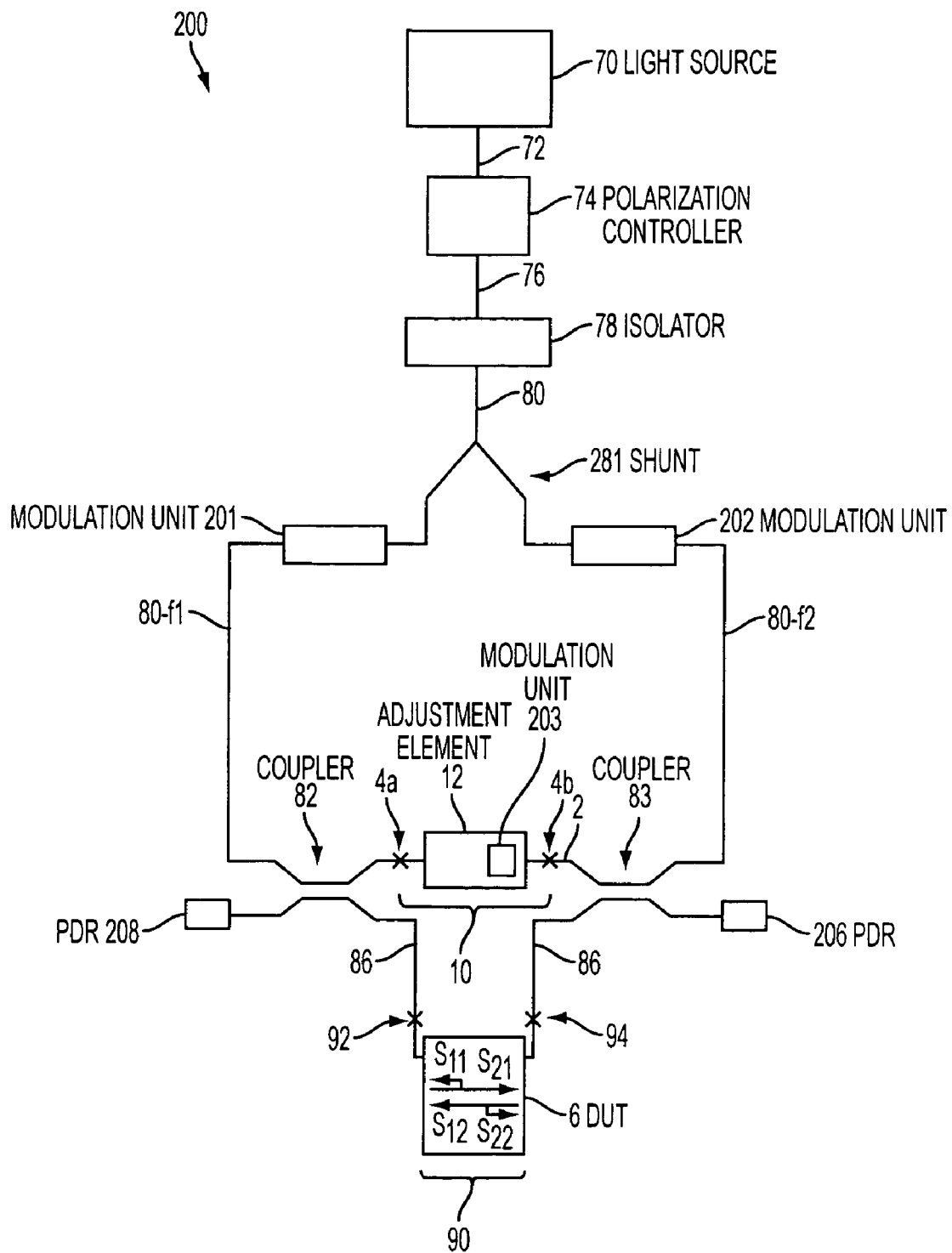
FIG. 2 shows a second measurement setup according to the present invention.

FIG. 2 shows a second embodiment 200 of a measurement setup according to the present invention. Contrary to the embodiment 1 of FIG. 1 embodiment 200 of FIG. 2 has no switch 81. Instead in setup 200 a shunt 281 replaces switch 81. The shunt 281 provides the reference arm 2 and the measurement arm 86 with the signal 80, simultaneously. To distinguish the signals propagating through the DUT 6 the two fractions of the light propagating through the DUT in opposite directions are coded by two different modulation frequencies f1 and f2 provided by two modulation units 201 and 202 providing a signal 80-f1 and a signal 80-f2. Then, the signals 80-f1 and 80-f2 are detected by using a PDR 206 and a PDR 208 having a phase sensitive detection scheme, i.e. by a frequency selective detection. Additionally, the element 12 contains a modulation unit 203 to key all signals transmitted or reflected by the element 12 with a modulation frequency f3.

To clarify the function of the decoding of the signals detected by PDR 206 and PDR 208 the Stokes matrix elements S11, S21, S12 and S22 are depicted in FIG. 2. Elements S11, S21, S12 and S22 can be derived from the coding frequencies f1, f2, f3 as follows:

At PDR 208: $S11=f1+/-f3$, $S12=f2-/+f3$, and at PDR 206: $S21=f1+/-f3$, $S22=f2-/+f3$.

What is claimed is:

1. A method of determining optical properties of a device under test in two directions in transmission and in reflection, comprising:
    splitting an initial measurement signal into at least a first and second measurement signal;
    coding the first measurement signal with a first code and the second measurement signal with a second code;
    feeding the first coded measurement signal into the device under test in one direction and the second coded measurement signal in another direction;
    receiving a signal including a reflected signal from the device under test in response to the first coded measurement signal and a transmitted signal from the device under test in response to the second coded measurement signal;
    detecting the reflected and transmitted signals by decoding the received signal with the first and second code; and
    utilizing the detected reflected and transmitted signals to determine the optical properties of the device under test.

2. The method of claim 1, further comprising:
    deriving a first and second reference signal from the first and second coded measurement signals, respectively; and
    superimposing the first and second reference signals on the reflected and transmitted signals, respectively.

3. A software program or product, embodied on a computer readable medium, for executing the method of claim 1 when run on a data processing system such as a computer.

4. The method of claim 1, wherein coding the first measurement signal with a first code includes modulating the first measurement signal with a first frequency and coding the second measurement signal with a second code includes modulating the second measurement signal with a second frequency.

5. The method of claim 1, further comprising balancing the optical path lengths through the unit under test.

6. The method of claim 1, wherein detecting the reflected and transmitted signals is performed by polarization diversity receivers.

7. The method of claim 1, further comprising detecting the reflected and transmitted signals using frequency selective detection.

8. A measurement setup for determination of optical properties of a device under test in both directions in transmission and in reflection, comprising:

a device for splitting a measurement signal into at least a first and second measurement signal;

coding devices for coding the first measurement signal with a first code and a second measurement device with a second code;

feeding elements feeding the first measurement signal into the device under test from one direction and the second coded measurement signal in another direction; and receiving elements for receiving a signal including a reflected signal from the device under test in response to the first coded measurement signal and a transmitted signal from the device under test in response to the second coded measurement signal, and for detecting the reflected and transmitted signals by decoding the received signal with the first and second code to determine the optical properties of the device under test.

9. The setup of claim 8, wherein the coding device further comprises a switch sequentially feeding one part of the measurement signal into a first path entering the device under test from the one direction and the other part of the measurement signal into a second path entering the device under test from the other direction.

10. The setup of claim 8, wherein the coding devices code the first measurement signal with a first code by modulating the first measurement signal with a first frequency and the coding devices code the second measurement signal with a second code by modulating the second measurement signal with a second frequency.

11. The setup of claim 8, further comprising:

a reference arm for deriving a first and second reference signal from the first and second coded measurement signals, respectively; and first and second couplers for superimposing the first and second reference signals on the reflected and transmitted signals, respectively.

12. The setup of claim 8, further comprising an adjustment element for balancing the optical path lengths through the unit under test.

13. The setup of claim 8, wherein the receiving elements each comprise a polarization diversity receiver.

14. The setup of claim 8, wherein the receiving elements detect the reflected and transmitted signals using frequency selective detection.

15. A method of determining optical properties of a device under test in two directions in transmission and in reflection, comprising:

splitting an initial measurement signal into at least a first and second measurement signal;

coding the first and second measurement signals by modulating the first measurement signal with a first frequency and the second measurement signal with a second frequency;

feeding the first coded measurement signal into the device under test in one direction and the second coded measurement signal in another direction;

receiving a signal including a reflected signal from the device under test in response to the first coded measurement signal and a transmitted signal from the device under test in response to the second coded measurement signal; and detecting the reflected and transmitted signals using frequency selective detection; and utilizing the detected reflected and transmitted signals to determine the optical properties of the device under test.

* * * * *